United States Patent [19]

Tsukagoshi

[11] Patent Number: 5,198,900
[45] Date of Patent: Mar. 30, 1993

[54] VIDEO SIGNAL ENCODING APPARATUS

[75] Inventor: Ikuo Tsukagoshi, Tokyo, Japan

[73] Assignee: Sony Corporation, Tokyo, Japan

[21] Appl. No.: 714,719

[22] Filed: Jun. 13, 1991

[30] Foreign Application Priority Data

Jun. 22, 1990 [JP] Japan ................................. 2-164467

[51] Int. Cl.$^5$ ............................................. H04N 7/133
[52] U.S. Cl. ..................................... 358/136; 358/133
[58] Field of Search ................ 358/136, 133, 135, 141

[56] References Cited

U.S. PATENT DOCUMENTS

| | | | |
|---|---|---|---|
| 3,761,613 | 9/1973 | Limb | 358/136 |
| 4,144,543 | 3/1979 | Koga | 358/136 |
| 4,821,119 | 4/1989 | Gharavi | 358/133 |

OTHER PUBLICATIONS

Matsumoto et al., "Coding Performance of Motion-Compensated Interframe, Interfied, and Intrafied Adaptive Prediction Coding for Composite and Component TV Signals", SMPTE Journal, May 1986, pp. 542-549.

Primary Examiner—James J. Groody
Assistant Examiner—David E. Harvey
Attorney, Agent, or Firm—Alvin Sinderbrand; William S. Frommer

[57] ABSTRACT

A video signal encoding system is arranged in such a manner that an input video signal is subjected to a high efficiency encoding process so as to be a difference signal before it is transformed in a discrete cosine transformation. The discrete cosine transformation coefficient data thus obtained is encoded to digital data signals which are allocated to a plurality of time slots. Among a plurality of the time slots is inserted an additional data time slot to which an additional data denoting the method of the high efficiency encoding so as to be capable of overcoming a problem of the presence of a limitation in the length of the variable length encoding word of the discrete cosine transformation coefficient data, and another problem in terms of the necessity of enlarging the size of the signal processing circuits for transmitting the discrete cosine transformation coefficient data.

2 Claims, 11 Drawing Sheets

FIG.1

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

$C_{oeff}(i)$ $(i=1\sim 64)$

VIDEO SIGNAL ENCODING APPARATUS

BACKGROUND OF THE INVENTION

1. Field of the Invention

The present invention relates to a video signal encoding apparatus, and, more particularly, to a video signal encoding apparatus for converting a video signal into video data by encoding it in a high efficiency manner.

2. Description of the Related Art

There has been disclosed in, for example, Japanese Patent Laid-Open No. 63-1183, a video signal transmission system adapted to a TV telephone system, a conference telephone system and the like in which video signals each of which is composed of moving pictures are encoded in a high efficiency manner by using data encoded in an intraframe manner and data encoded interframe manner so as to be converted into difference data. As a result, the quantity of data of the video signals to be transmitted can be compressed so as to be transmitted through a passage which involves a limit of the quantity of data to be transmitted.

Figure 1:
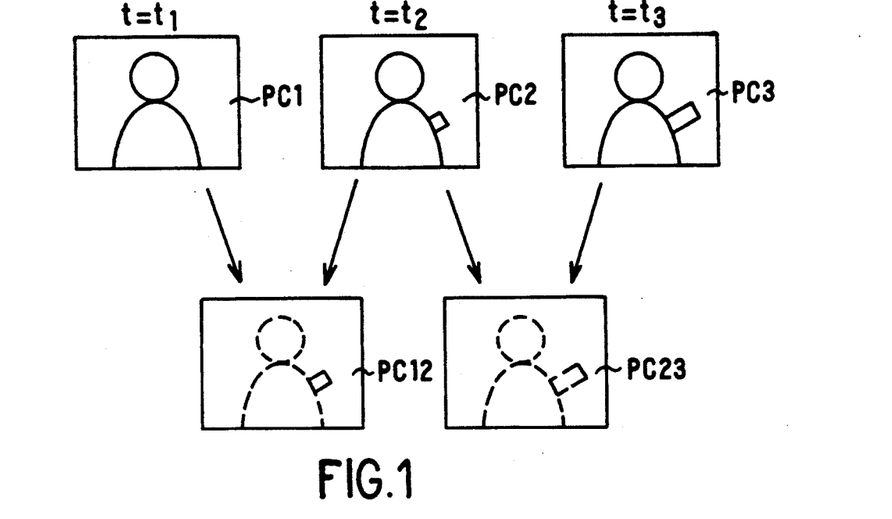
FIG. 1 is a graph which illustrates a high efficiency encoding method.

For example, as shown in FIG. 1, when the video signal transmission system of the type described above transmits images PC1, PC2, PC3, ..., which constitute a moving picture, at points $t=t_1, t_2, t_3, \ldots$, it improves the transmission efficiency by subjecting the video data to be transmitted to a compression process by utilizing the characteristics of the video signal such that the auto-correlation is enlarged with the lapse of time. The intraframe encoding process is performed in such a manner that the images PC1, PC2, PC3, ..., are subjected to a compression process in which, for example, pixel data is subjected to a comparison with a predetermined reference value so as to obtain the difference. As a result, the data of each of the images PC1, PC2, PC3, ..., is transmitted by a data quantity which has been compressed by utilizing the cross-correlation between image data items in the same frame.

On the other hand, as shown in FIG. 1, the interframe encoding process is performed in such a manner that image data items PC12, PC23, ..., each of which is the difference between image data items of the adjacent image PC1 and PC2, PC2 and PC3, ..., are obtained. Furthermore, the thus obtained image data items PC12, PC23, ..., are transmitted together with an image obtained by subjecting the initial image PC1 at the time $t=t_1$ to the intraframe encoding process.

As a result, the images PC1, PC2, PC3, ..., can be transmitted in the form of digital data the quantity of which has been significantly reduced in comparison to a case where all of image data items of the images PC1, PC2, PC3, ..., are transmitted since they have been subjected to a high efficiency encoding process.

Figure 2:
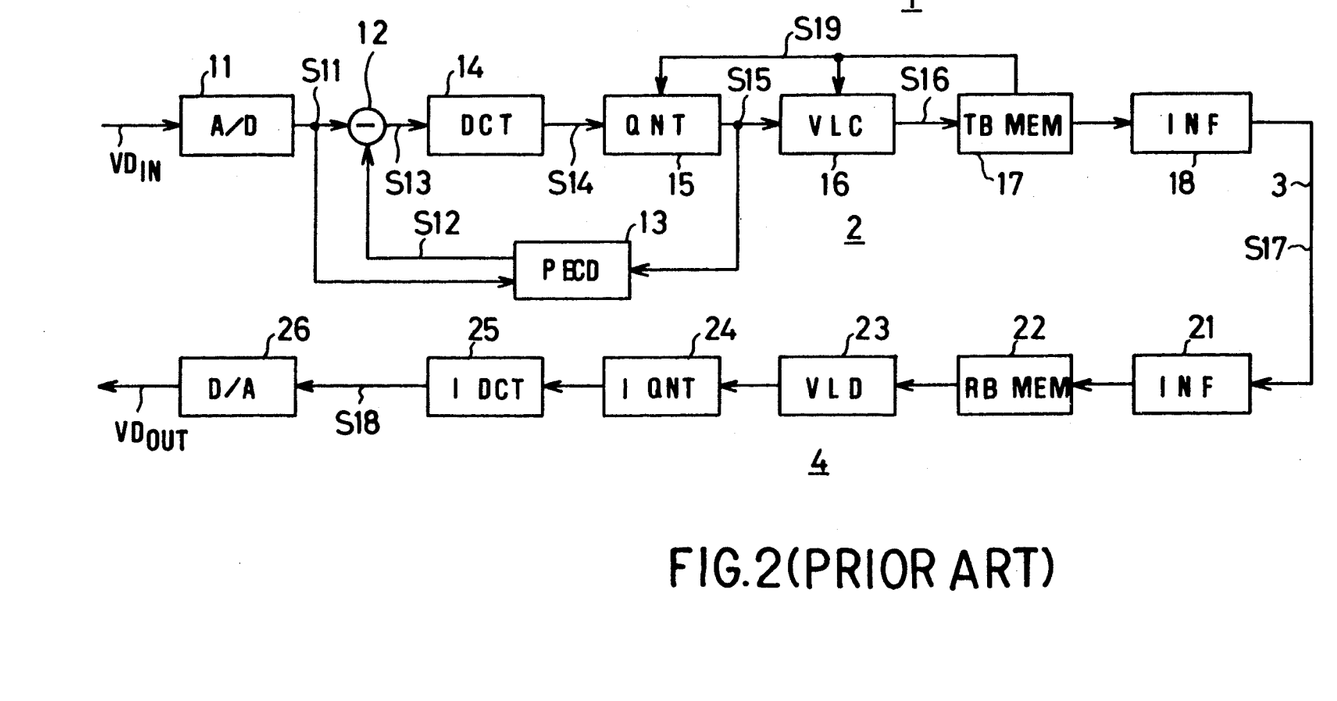
FIG. 2 illustrates the structure of a conventional video signal transmitting system.

The above-described process of encoding the video signals can be applied to a case where video signal data obtainable from the encoding process performed in a video signal encoding apparatus 2 is transmitted to a video signal decoding device 4 via a transmission passage 3 in a video signal transmission system 1 structured as shown in FIG. 2.

The video signal encoding apparatus 2 subjects an input video signal $VD_{IN}$ to a previous process in its analog/digital conversion processing portion 11. Then, the video signal encoding apparatus 2 converts a brightness signal and a chromatic signal which constitute the input video signal $VD_{IN}$ into transmission unit block data S11 of a predetermined number of pixels (which are constituted by, for example, 8 pixels in the horizontal direction×8 pixels in the vertical direction) so as to transmit it to a video data encoding circuit 12.

The video data encoding circuit 12 receives predicted present frame data S12 formed by a prediction encoding circuit 13 so as to obtain difference data S13 from the transmission unit block data S11 so that encoding data between frames is generated (hereinafter called an "interframe encoding mode"). As an alternative to this, the video data encoding circuit 12 receives, as the predicted present frame data S12, reference value data and obtains data S13' from the transmission unit block data S11 so that intraframe encoding data is formed (hereinafter called an "intraframe encoding mode"). As a result, the difference data S13 obtainable in the image data encoding circuit 12 by the interframe encoding process or data S13' by the intraframe encoding process is supplied to a discrete cosine transformation (DCT) circuit 14.

The discrete cosine transformation circuit 14 orthogonally transforms the difference data S13 so as to supply transformation encoding data S14 to a quantizing circuit 15. As a result, the quantizing circuit 15 transmits quantized video data S15.

The quantized video data S15 obtained in the quantizing circuit 15 is again compressed in a variable length encoding circuit (VLC circuit) 16 before it is supplied to a transmission buffer memory 17 as transmission video data S16.

The transmission buffer memory 17 temporarily receives the transmission video data S16 supplied from the variable length encoding circuit 16 before the transmission buffer memory 17 transmits it as transmission data S17 to the transmission passage 3 via an interface circuit 18 at a predetermined data transmitting speed so that the transmission data S17 is transmitted to the video signal decoding device 4.

Furthermore, the quantized video data S15 is subjected to an inverse quantizing process and a inverted discrete cosine transformation process in the prediction encoding circuit 13 so as to be detected to the difference data. The pre-prediction frame data stored in a frame memory of the prediction encoding circuit 13 is modified by the thus decoded difference data so that a novel pre-prediction frame data is formed so as to be stored in the frame memory.

In addition, the prediction encoding circuit 13 calculates the correlation between the thus stored novel pre-prediction frame data and the transmission unit block data S11 so as to obtain movement detection data. If a determination is made that the degree of the movement is a small degree, block data of the pre-prediction frame data which corresponds to the above-described transmission unit block data S11 is read out so as to be supplied to the video data encoding circuit 12 as the predicted present frame data S12 together with the movement detection data. As a result, the difference data S13 which has been subjected to the process of encoding between frames can be obtained.

If the movement detection data was not detected (it means a fact that the degree of the change of the image of the transmission unit block which corresponds to the above-described transmission unit block data is an intense degree), the prediction encoding circuit 13 supplies predetermined reference data as the predicted present frame data S12 to the video data encoding circuit 12. As a result, the difference data S13, which has been subjected to the intraframe encoding process, is formed.

The video signal decoding device 4 receives the transmission data S17 transmitted from the video signal encoding apparatus 2 via the transmission passage 3 by its receiving buffer memory 22 via an interface circuit 21. Then, the transmission data S17 transmitted in each transmission unit is decoded to transmission unit block decoding data S18 by a variable length decoding circuit 23, an inverse quantizing circuit 24 and a inverted discrete cosine transformation circuit (DCT inverse transformation circuit) 25. Then, the decoding data S18 is converted into a video signal by a digital/analog conversion processing portion 26 so as to be transmitted as output video signal $VD_{OUT}$.

In a case where the moving picture described with reference to FIG. 1 is transmitted in the structure shown in FIG. 2, the video data encoding circuit 12 is brought to the intraframe encoding mode when the image data of the image PC1 is supplied as the transmission unit block data S11 at point $t=t_1$ shown in FIG. 1. As a result, it subjects the transmission unit block data S11 to the intraframe encoding process so as to transmit it as the difference data S13 to the discrete cosine transformation circuit 14. As a result, the transmission video data S16 is supplied to the transmission buffer memory 17 via the quantizing circuit 15 and the variable length encoding circuit 16.

Simultaneously, the quantized video data S15 obtained at the output terminal of the quantizing circuit 15 is subjected to the prediction encoding process in the prediction encoding circuit 13 so that the pre-prediction frame data denoting the transmission video data S16 transmitted to the transmission buffer memory 17 is stored in the frame memory provided for the prediction encoding circuit 13.

When the transmission unit block data S11 denoting the image PC2 at point $t=t_2$ is then supplied to the video data encoding circuit 12, the prediction encoding circuit 13 supplies the predicted present frame data S12 obtained by adding movement vector data to the pre-prediction frame data to the video data encoding circuit 12 if the degree of the change of the image of the transmission unit block data S11, which has been newly supplied, is a small degree. As a result, the difference data S13, which has been subjected to the interframe encoding process, is transmitted from the video data encoding circuit 12.

If the degree of the change of the newly supplied transmission unit block data S11 is an intense degree, the prediction encoding circuit 13 supplies the predetermined reference data as the predicted present frame data S12 to the video data encoding circuit 12. As a result, the difference data S13, which has been subjected to the intraframe encoding process, is transmitted from the video data encoding circuit 12.

As a result, the video data encoding circuit 12 supplies the difference data S13, which has been subjected to the interframe encoding process or the intraframe encoding process, to the discrete cosine transformation circuit 14 at point $t=t_2$. As a result, the difference data S13 denoting the change in the image between frames or within the frame is supplied to the transmission buffer memory 17 as the transmission video data S16.

The transmission buffer memory 17 receives the transmission video data S16 thus supplied before it successively transmits the stored transmission video data S16 as the transmission data S17 to the transmission passage 3 at a predetermined data transmitting speed which is determined by the transmitting capacity of the transmission passage 3.

Simultaneously, the transmission buffer memory 17 detects the residual data quantity so as to feed back residual quantity data S19, which is changed in accordance with the residual data quantity, to the quantizing circuit 15 and to the variable length encoder circuit 16. As a result, the transfer buffer memory 17 controls the quantizing step size in accordance with the residual data quantity S19 so as to adjust the quantity of data generated as the transmission video data S17. Consequently, a proper residual data quantity (a quantity which prevents overflow or underflow) can be maintained in the transmission buffer memory 17.

As described above, the difference data S13, which can be obtained after the input video signal $VD_{IN}$ has been converted into the transmission unit block data S11, is orthogonally converted into in the discrete cosine transformation circuit 14. Then, the transmission data S17 to be transmitted to the video signal decoding device 4 is generated in accordance with the transformation encoding data S14 which can be obtained due to the above-described orthogonal conversion. If the image of the transmission unit block data S11, which is desired to be transmitted at present, is intensely changed when the difference data S13 is obtained in the video data encoding circuit 12, the intraframe encoding process is performed. As a result, the data quantity to be transmitted is enlarged. On the contrary, if the image of the transmission unit block data S11 is not changed or if the same is a small degree, the interframe encoding process is performed. As a result, the quantity of data to be transmitted is reduced. Consequently, the quantity of data to be transmitted can be efficiently controlled so as to correspond to the change in the image of the input video signal $VD_{IN}$.

When the encoding method which is adaptively selected in the video data encoding circuit 12 is used, it is necessary for the structure to be arranged in such a manner that, whenever the transmission unit block data S11 for each one unit block is transmitted, an identification flag denoting the method of encoding the data for the one block is inserted into the transformation encoding data 14 before the transformation encoding data S14 is transmitted from the discrete cosine transformation circuit 14 so as to be transmitted.

When the transmission unit block data S11 for one unit is converted into the transformation encoding data S14 in the discrete cosine transformation circuit 14 so as to be transmitted to the video signal decoding device 4, the video signal decoding device 4 must recognize the fact that the transmission data S17 which has been transmitted has been encoded by the interframe encoding process or by the intraframe encoding process when each of the transmission unit block data S11 is supplied. Thus, the video signal decoding device 4 is able to efficiently process the transmitted data S17.

SUMMARY OF THE INVENTION

In view of the foregoing, an object of the present invention is to provide a video signal encoding apparatus in which as identification flag for identifying the video data encoding method can be easily inserted while maintaining the simple structure of its processing circuit.

In order to achieve the above-described object, according to one aspect of the present invention, there is provided a video signal encoding apparatus arranged in such a manner that an input video signal $VD_{IN}$ is subjected to a high efficiency encoding process so as to be a difference signal S13 before it is converted in a discrete cosine transformation manner and discrete cosine transformation coefficient data $C_{oeff}(i)(i=1$ to 64) thus obtained is encoded to digital data signals which are allocated to a plurality of time slots $T_1$ to $T_{64}$, the video signal encoding apparatus comprising: additional data insertion means 14A for inserting additional data time slots $T_0$ into the plurality of time slots $T_1$ to $T_{64}$ and allocating additional data F/F and MV denoting conditions for performing the high efficiency encoding process to the additional data time slots $T_0$.

According to second and third aspects of the present invention, encoding method identification flag data F/F or motion vector MV is allocated as said conditions for performing said high efficiency encoding process.

As described above, the additional data time slots $T_0$ are inserted into a plurality of time slots $T_1$ to $T_{64}$ to which the discrete cosine transformation coefficient data $C_{oeff}(i)(i=1$ to 64) which can be obtained by the discrete cosine transformation is allocated. The additional data F/F or MV denoting the conditions for performing the high efficiency encoding process is allocated to the above-described additional data time slots $T_0$.

As a result, a video signal encoding apparatus can be realized in which the additional data such as a control signal which is required when the discrete cosine transformation coefficient data is decoded, can easily be decoded while preventing an undesirable influence such that the circuit system for transmitting the discrete cosine transformation coefficient data is too complicated or the data quantity is limited.

Other and further objects, features and advantages of the invention will be appear more fully from the following description.

DESCRIPTION OF THE PREFERRED EMBODIMENTS

Referring to the drawings, a description will now be made about an embodiment constituted by adapting the present invention to a TV telephone system in which a precise TV signal is used.

(1) Overall structure of the embodiment

Figure 3:
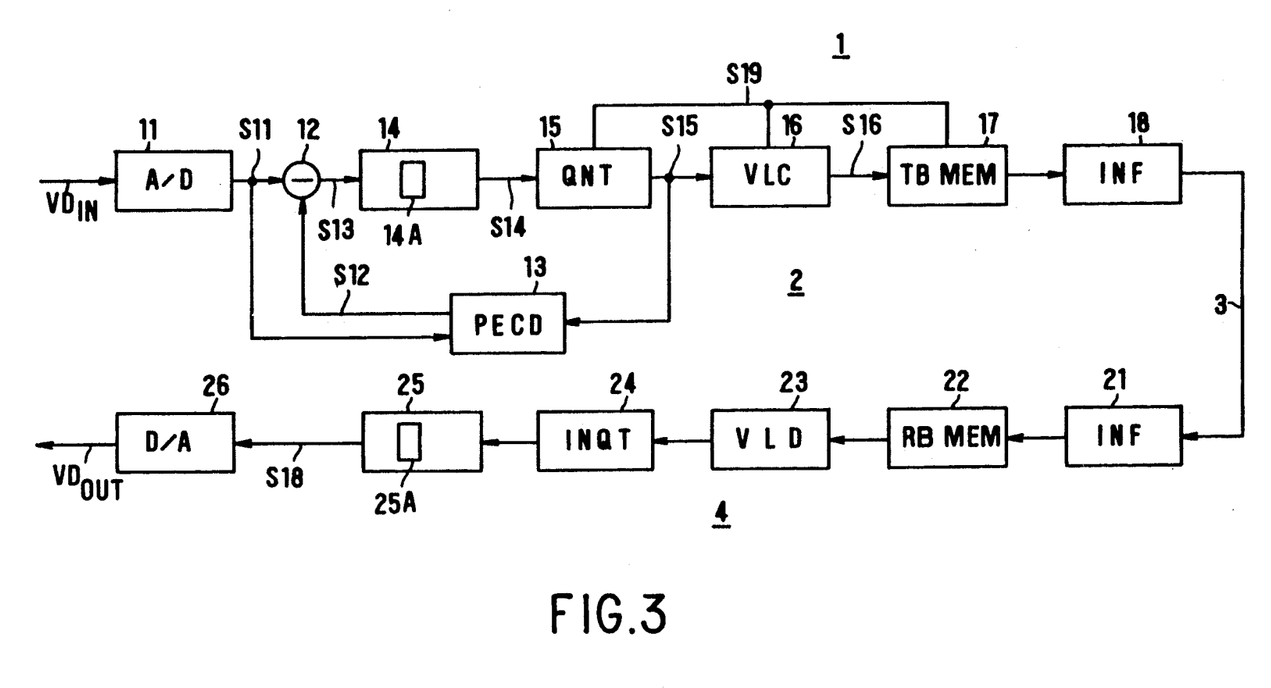
FIG. 3 is a block diagram which illustrates an embodiment of a video signal encoding apparatus according to the present invention.

Referring to FIG. 3, where the corresponding elements to those shown in FIG. 2 are given the same reference numerals, a discrete cosine transformation circuit 14 has, as an additional data slot insertion means, a time slot insertion circuit 14A. The inverted discrete cosine transformation circuit 25 has, as an additional data deletion means, a time slot deletion circuit 25A.

Whenever transmission unit block data S11 for one unit block is supplied to the discrete cosine transformation circuit 14 from an analog/digital conversion processing portion 11, the discrete cosine transformation circuit 14 transforms difference data S13 in a discrete cosine transformation manner, the difference data 13 corresponding to the transmission unit block data S11. As a result, the discrete cosine transformation circuit 14 generates a predetermined number of, for example, 64 transformation coefficient data items. The thus generated 64 transformation coefficient data items are then successively allocated to corresponding time slots so as to be transmitted as transformation encoded data S14.

Figure 4:
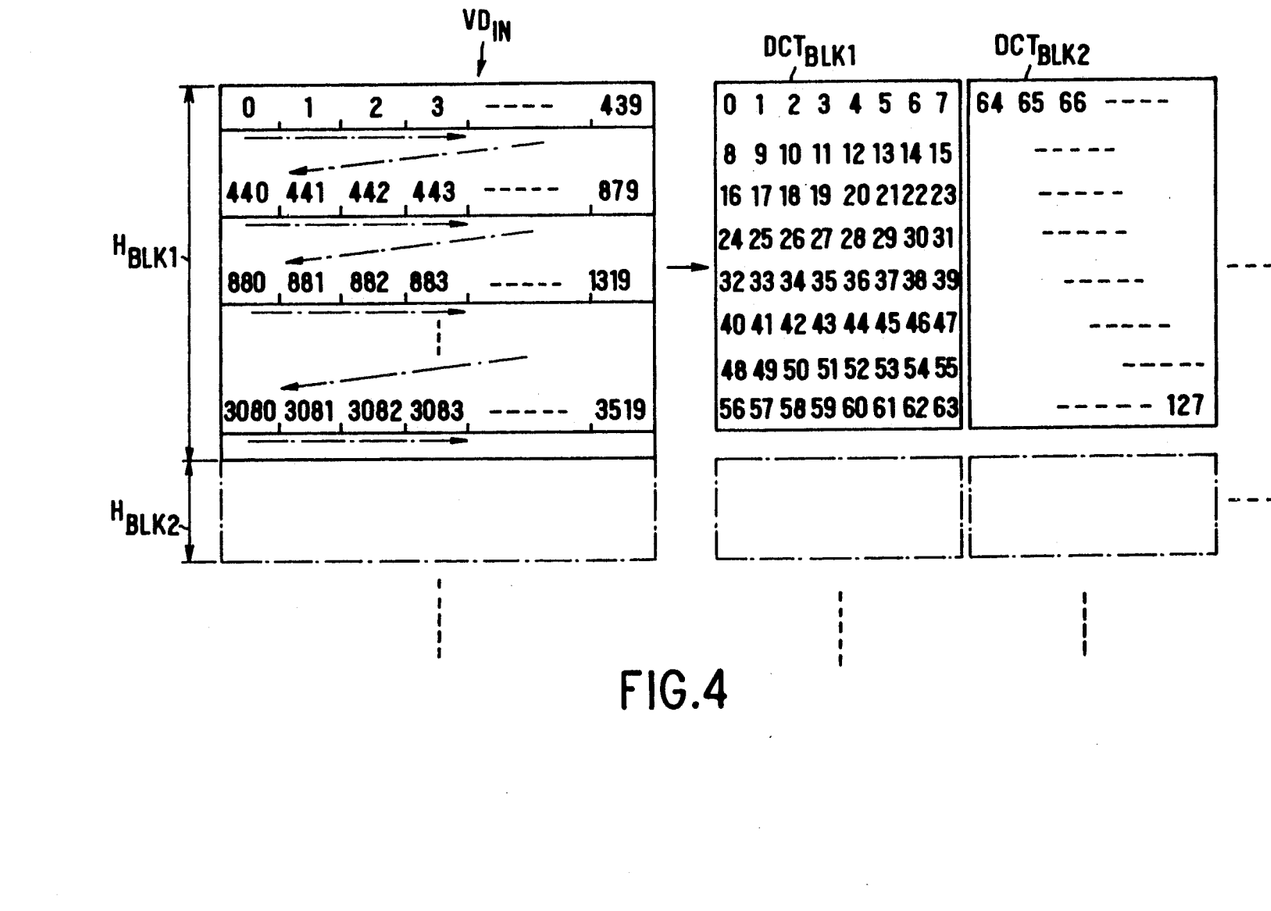
FIG. 4 illustrates the format conversion from raster scan to discrete cosine transformation blocks.

According to this embodiment, in order to cause the discrete cosine transformation circuit 14 to perform the discrete cosine transformation process, the analog/digital conversion processing portion 11 forms blocks each of which is, as shown in FIG. 4, constituted by data items for $8 \times 8$ pixels as the unit block of the discrete cosine transformation process, that is, as a discrete cosine transformation block (hereinafter called a "DCT block").

Namely, as shown in FIG. 4, the analog/digital conversion processing portion 11 divides pixel data, which has been obtained from an input video signal $VD_{IN}$, into large blocks $H_{BLK1}, H_{BLK2}, \ldots$, for every 8 horizontal scanning lines. Furthermore, the analog/digital conversion processing portion 11 further divides the 0-th to the 3519-th pixels, which are included in each of the large blocks, into small blocks $DCT_{BLK1}, DCT_{BLK2}, \ldots$, for $8 \times 8$ pixels in the above-described sequential order.

Figure 5:
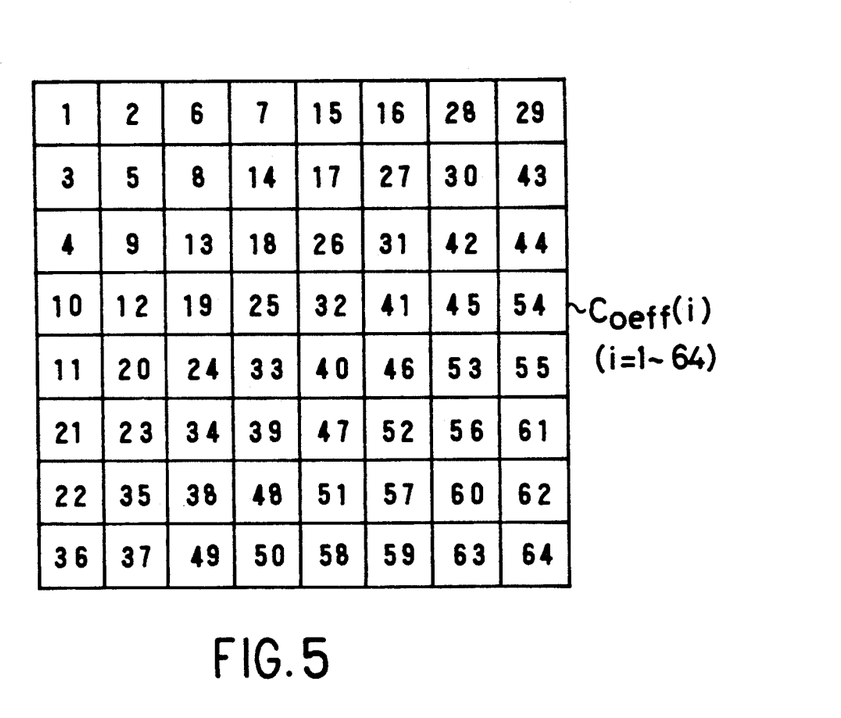
FIG. 5 illustrates the scan conversion transformation coefficient data obtained in a discrete cosine transformation circuit 14.

Thus, a two-dimensional data array can be formed by $8 \times 8 = 64$ pixel data items in each of the DCT blocks $DCT_{BLK1}, DCT_{BLK2}, \ldots$. The discrete cosine transformation circuit 14 subjects each of the DCT blocks $DCT_{BLK1}, DCT_{BLK2}, \ldots$, to the discrete cosine transformation process so as to form a transformation coefficient matrix of transformation coefficient $C_{oeff}(i)(i=1$ to 64) as shown in FIG. 5.

The transformation coefficient matrix (see FIG. 5) denotes the signal level of a spatial frequency component of the pixel data array which constitutes the DCT blocks $DCT_{BLK1}, DCT_{BLK2}, \ldots$, while transformation coefficient $C_{oeff}(1)$ at the position of $i=1$ positioned at the coordinate of the top left position denotes a DC signal component (DC component) showing the brightness of the image of the transmission unit block data S11. Furthermore, the other transformation coefficients, that is, $i=2, 3, \ldots,$ 64-th transformation coefficients $C_{oeff}(2), C_{oeff}(3), \ldots, C_{oeff}(64)$ positioned successively adjacently to each other in a zigzag manner denote an alternate signal component (AC component) showing the signal level of each of the spatial frequency components in the transmission unit block data S11, that is, the change (that is, change in the picture of the image) between pixel data items which constitute the transmission unit block data S11.

The discrete cosine transformation circuit 14 reads out the transformation coefficient data $C_{oeff}(i)(i=1$ to 64) which constitutes the transformation coefficient matrix at a timing of a predetermined period clock signal in the sequential order from $i=1$ to $i=64$ in a zigzag scanning manner. As a result, the discrete cosine transformation circuit 14 time-serially transmits the transformation coefficient data as the transformation encoded data S14 by using 64 time slots $T_1, T_2, \ldots, T_{64}$ (see FIG. 6A), the transformation coefficient data being positioned at the spatial frequency position which corresponds to the image brightness and the picture change on the image plane of the DCT blocks $DCT_{BLK1}$, $DCT_{BLK2}, \ldots$.

Figure 6A:
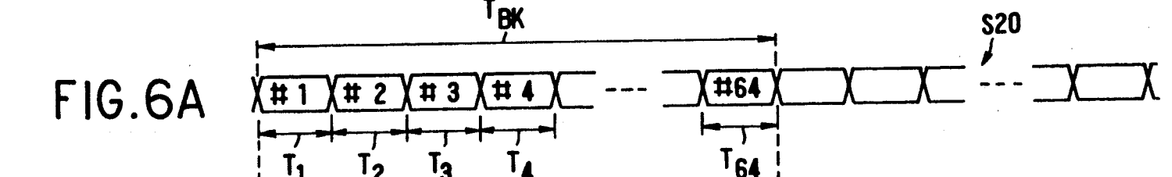
FIGS. 6A and 6B are time charts which illustrate time slots allocated to transformation coefficient data.

As a result, in a case where the time slot insertion circuit 14A is not provided, the discrete cosine transformation circuit 14, as shown in FIG. 6A, first transmits DC data constituted by the value of the $i=1$ transformation circuit 14, as shown in FIG. 6A, first transmits DC data constituted by the value of the $i=1$ transformation coefficient $C_{oeff}(1)$ and ensuing AC data constituted by the values of the $i=2, 3, \ldots, 64$ transformation coefficients $C_{oeff}(2), C_{oeff}(3), \ldots, C_{oeff}(64)$.

Figure 6B:
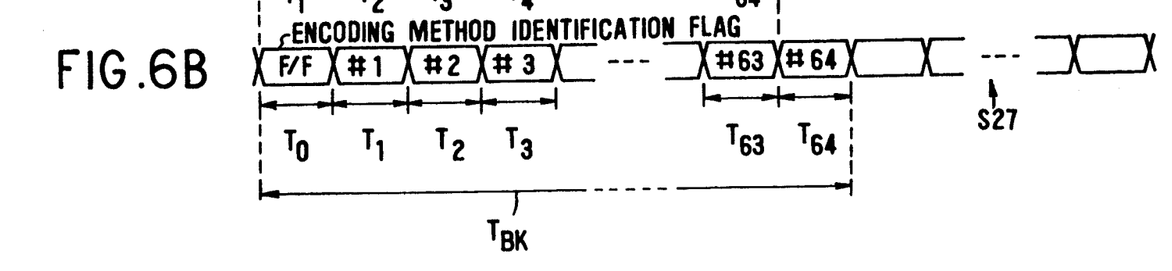

On the other hand, the time slot insertion circuit 14A inserts, as shown in FIG. 6B, additional data time slot $T_0$ into a position immediately ahead of the $i=1$ DC data and as well as allocates encoding method identification flag data F/F as additional data to the above-described additional data time slot $T_0$.

The encoding method identification flag data F/F denotes the encoding method which is adaptively performed by an image data encoding circuit 12 in accordance with the contents of the image of the DCT block $DCT_{BLKj}$ ($j=1, 2, \ldots,$) which is desired to be transmitted at present.

According to this embodiment, the image data encoding circuit 12 encodes the DCT block $DCT_{BLKj}$ in a method of interframe encoding when there is no change of the image of the transmission unit block data S11 or when the degree of the change is small, whereby the difference data S13 is formed.

On the other hand, when the image change of the DCT block $DCT_{BLKj}$ is intense, the image data encoding circuit 12 performs the intrafield encoding process so as to transmit the difference between each of the pixel data items and reference data in the field, the difference being transmitted as the difference data S13.

The encoding method identification flag data F/F denotes, as an identification flag, a fact that the image data encoding circuit 12 performed the interframe encoding process or the intrafield encoding process.

Thus, as shown in FIG. 6B, the transformation encoding data S14 is arranged to have a data array with which flag information denoting the method of encoding the DCT block $DCT_{BLKj}$ ($j=1, 2, \ldots,$) is transmitted in the 0-th time slot $T_0$ positioned at the front portion of block conversion period $T_{BK}$ which corresponds to each of the DCT blocks $DCT_{BLKj}$ ($j=1, 2, \ldots,$). Furthermore, the DC transformation coefficient data is transmitted in the next, that is, the first, time slot $T_1$. Then, first, second, $\ldots,$ 64-th AC transformation coefficient data is transmitted in the ensuing time slots, that is, the second, third, $\ldots,$ 64-th time slots.

In this case, the block transformation period $T_{BK}$ is, as shown in FIG. 6B, made longer than that in the case shown in FIG. 6A by a degree which corresponds to the insertion of the 0-th time slot $T_0$.

As described above, when a video encoding device 2 efficiently encodes the image data of the input video signal $VD_{IN}$ into the difference data S13 in its video data encoding circuit 12, the additional data time slot $T_0$ is inserted so as to allocate the encoding method identification flag data F/F, which shows the encoding method, to the above-described additional data time slot $T_0$. As a result, the identification information showing the encoding method can be transmitted prior to transmitting the discreet cosine transformation coefficient data $C_{oeff}(i)$.

(2) Time slot insertion circuit 14A

Figure 7:
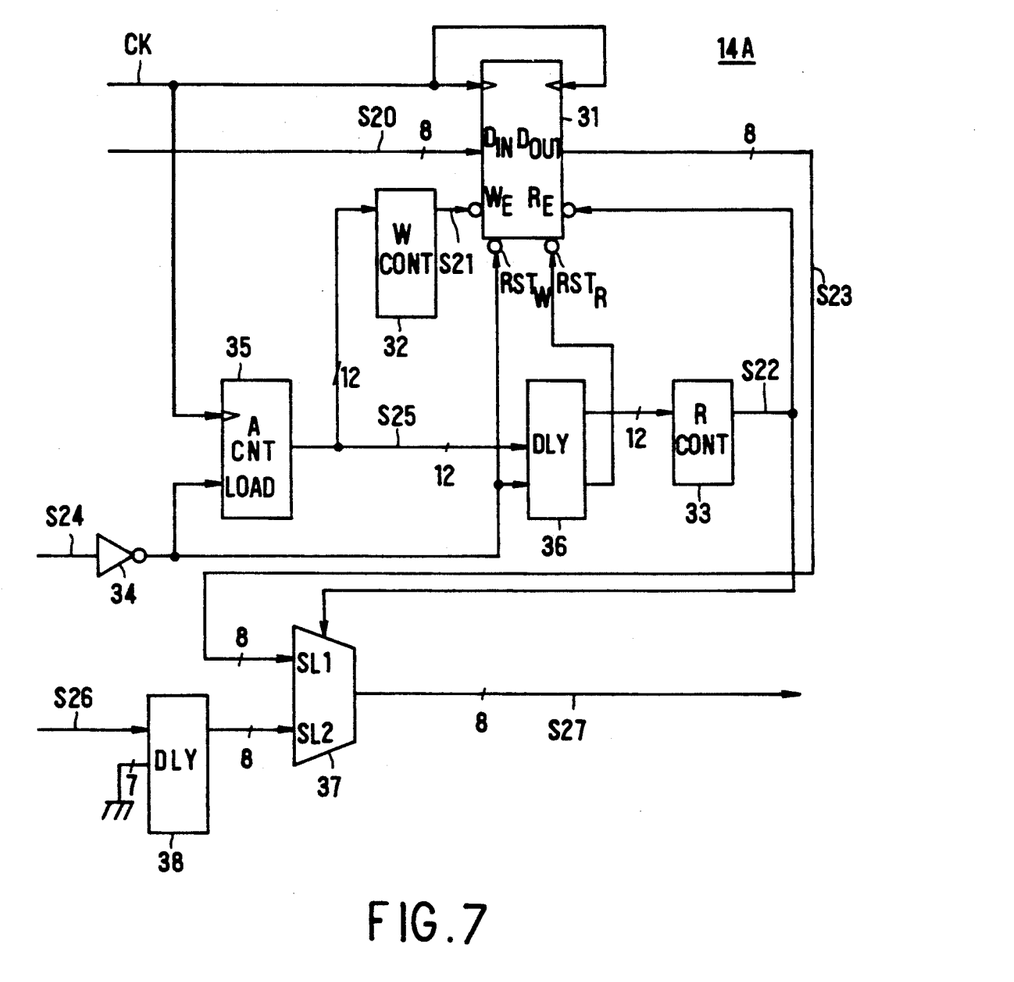
FIG. 7 illustrates the time slot insertion circuit 14A shown in FIG. 3 in a further detailed manner.

As shown in FIG. 7, the time slot insertion circuit 14A includes a data memory 31 comprising an FIFO (First-in First-out) memory. The time slot insertion circuit 14A reads, at a timing of a clock signal CK, transformation coefficient input data S20 to be supplied to a data input terminal $D_{IN}$, the reading being performed in a state where a write enable signal S21 is supplied from the writing control circuit 32. Furthermore, the time slot insertion circuit 14A reads out each of data items of the thus read transformation coefficient input data S20 as transformation coefficient output data S23 through a data output terminal $D_{OUT}$ starting from the front data item at the timing of the clock signal CK in a state where a read enable signal S22 is supplied from a reading control circuit 33.

According to the embodiment shown in FIG. 7, the time slot insertion circuit 14A is arranged in such a manner that it counts the clock signal CK when a block line pulse S24, which is generated when the analog/-digital conversion processing portion 11 divides the input video signal $VD_{IN}$ into the DCT block $DCT_{BLKj}$, is supplied, via an inverter 34, to a load input terminal LOAD of an address counter circuit 35 consisting of, for example, a 12-bit counter.

A count output S25 from the address counter circuit 35 is directly supplied to the writing control circuit 32 and the same is also supplied to the reading control circuit 33 via a delay circuit 36. As a result, the time slots until the block line pulses S24 for a predetermined number of lines (8 lines according to this embodiment) reach intermittently can be formed on the basis of the period of the clock signal CK. Furthermore, each of data items of the transformation coefficient input data S20 is allocated to each of the above-described time slots so as to transmit it as the transformation coefficient data S23.

According to this embodiment, the writing control circuit 32 and the reading control circuit 33 are respectively constituted by a ROM (Read Only Memory) so as to read the write enable signal S21 and the read enable signal S22, which have been previously stored, at a predetermined timing by the address counter output S25 of the address counter circuit 35.

As a result, the transformation coefficient data S23 obtainable at the data output terminal $D_{OUT}$ is supplied to an input terminal SL1 of the two input terminals of a selection circuit 37. Furthermore, the other input terminal SL2 of the selection circuit 37 receives, via a delay circuit 38, additional data S26 consisting of the encoding method identification data F/F described with reference to FIG. 6B.

The read enable signal S22 is supplied to the selection signal input terminal of the selection circuit 37. As a result, the level of the read enable signal S22 is raised to an enable signal level in time slots $T_1$ to $T_{64}$ in the block conversion period $T_{BK}$ in which the DC or AC data is read out so that the first to 64-th transformation coefficient data items $C_{oeff}(i)(i=1$ to 64$)$ are successively read out from the data memory 31. Furthermore, it is used as a selection signal so as to select the input terminal SL1 of the two input terminals of the selection circuit 37. As a result, the first to the 64-th transform coefficient data items $C_{oeff}(i)(i=1$ to 64$)$ are transmitted as transformation coefficient output data S27.

Furthermore, the reading control circuit 33 raises the level of the read enable signal S22 to a disable signal level at a timing of the additional data time slot $T_0$ shown in FIG. 6 so that the reading of the data memory 31 is prohibited and as well as the input terminal SL2 of the selection circuit 37 is selected. As a result, the selection circuit 37 transmits the additional data S26 as the transformation coefficient output data S27.

In the structure shown in FIG. 7, when the coefficient data, which can be obtained when the DCT blocks $DCT_{BLK1}$, $DCT_{BLK2}$, ..., included in the corresponding large blocks $H_{BLK1}$, $H_{BLK2}$, ..., (see FIG. 4) are converted in a discrete cosine manner in the discrete cosine transformation circuit 14, reaches as the conversion coefficient input data S20 (see FIG. 6A), the data memory 31 successively reads the first to the 64-th transformation coefficient data $C_{oeff}(i)(i=1$ to 64$)$ in this sequential order.

On the other hand, when the transformation coefficient input data S20 for the DCT blocks $DCT_{BLK1}$, $DCT_{BLK2}$, ..., is read out, the reading control circuit 33 prohibits an operation of reading the transformation coefficient data S23 from the data memory 31 in the additional data time slot $T_0$ (see FIG. 6B) which is positioned at the front portion of the data items. In this state, the input terminal SL2 of the selection circuit 37 is selected in response to the read enable signal S22 so that the additional data S26 is transmitted in the above-described additional data time slot $T_0$. Then, the input terminal SL1 of the selection circuit 37 is again selected at a timing of the next time slot $T_1$, and the operation of reading the transformation coefficient data S23 in the data memory 31 is started.

The above-described operation is repeated whenever the reading control circuit 33 reads data which corresponds to any one of the DCT blocks $DCT_{BLK1}$, $DCT_{BLK2}$, ..., so that the additional data time slot $T_0$ can be inserted into the transformation coefficient output data S27 ahead of the time slots $T_1$ to $T_{64}$ in which the first to the 64-th transformation coefficient data items are transmitted.

Therefore, when the discreet cosine transformation coefficient data items $C_{oeff}(i)(i=1$ to 64$)$ of each of the DCT blocks $DCT_{BLK1}$, $DCT_{BLK2}$, ..., is transmitted, the transformation encoding data S14 transmitted from the discrete cosine transformation circuit 14 is, at its front portion, supplied with the encoding method identification flag data F/F showing the method of encoding the corresponding DCT block. As a result, a decoding process can be easily performed in a video signal decoding device 4.

As described above, since the time slot $T_0$, which is exclusively used at the time of transmitting the encoding method identification flag data F/F, is provided, the necessity of enlarging the size of the signal processing system for transmitting the transformation coefficient data $C_{oeff}(i)(i=1$ to 64$)$ can be eliminated.

Figure 8:
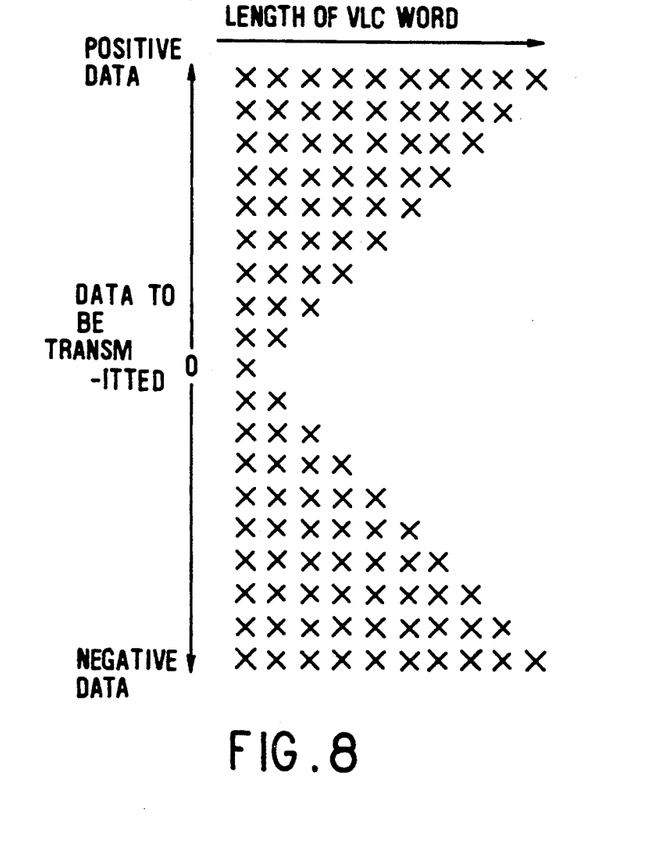
FIG. 8 illustrates the operation of the variable length encoding circuit 16 shown in FIG. 3.

In a case where the encoding method identification flag data F/F is transmitted without the additional data time slot $T_0$ inserted, there is a fear that a complicated signal processing operation must be completed in the ensuing circuit for processing the transformation encoding data S14, for example, in a variable length encoding circuit 16. However, the above-described problem of the complicated operation can be overcome in a case of the above-described structure according to the present invention.

That is, the variable length encoding circuit 16 allocates a variable length encoding word (VLC word) of a short word length to data which is probable to be generated so that the quantity of information to be transmitted can be efficiently compressed.

It might be considered feasible to transmit the additional data such as the encoding method identification flag data F/F together with the discrete cosine transformation coefficient data $C_{oeff}(i)(i=1$ to 64$)$ in such a manner that the exclusive time slot $T_0$ is not provided but the above-described additional data is caused to overlap a portion of the above-described data.

Figure 9A:
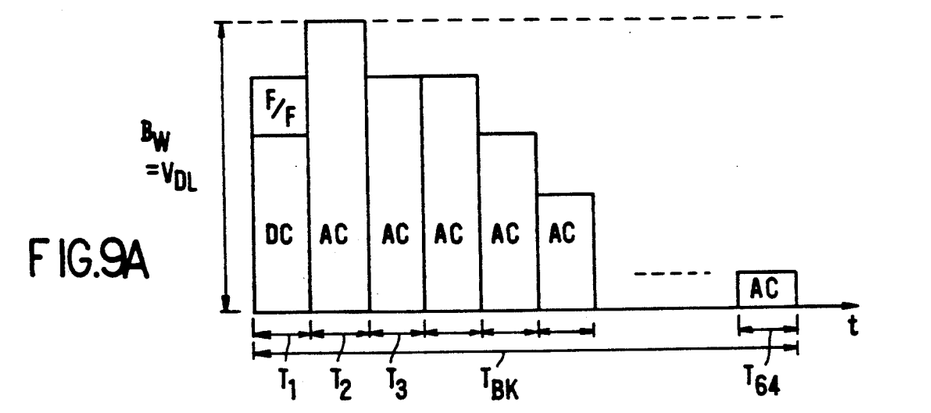
FIGS. 9A to 9C are time charts which illustrate an effect obtained when the additional data time slot is inserted.

For example, as shown in FIG. 9A, it might be considered feasible that the data transmission is performed in such a manner that the DC transformation coefficient data $C_{oeff}(1)$ is allocated to the lower bit of the time slot $T_1$ of the block transformation period $T_{BK}$ to which the DC transformation coefficient data $C_{oeff}(1)$ is allocated and the additional data, that is, the encoding method identification flag data F/F is caused to overlap the upper bit of the same.

However, a problem arises in the above-described case in that, when variable encoding data is allocated in the variable length encoding circuit 16 for the purpose of transmitting the DC transformation coefficient data $C_{oeff}(1)$ which constitutes the video data, it is impossible to transmit video data to which the variable length data is allocated to the maximum word length $V_{DL}$ (that is, the width of the data bus) which is allowed by the data bus. As a result, the quality of the image to be transmitted is deteriorated.

Figure 9B:
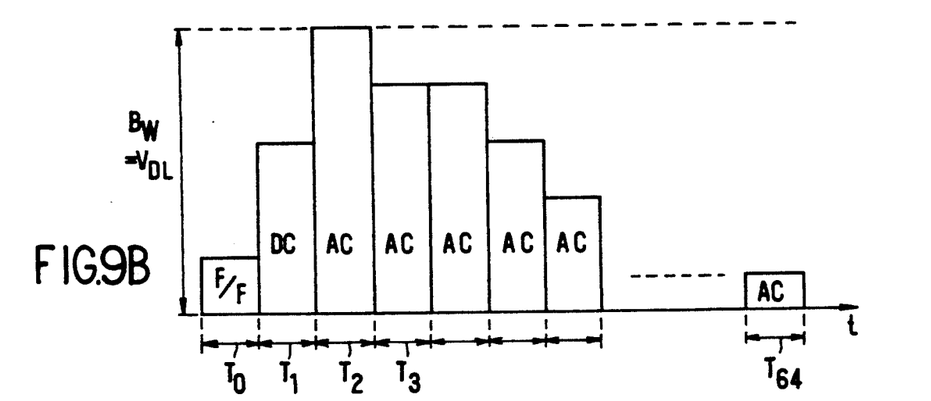
Figure 9C:
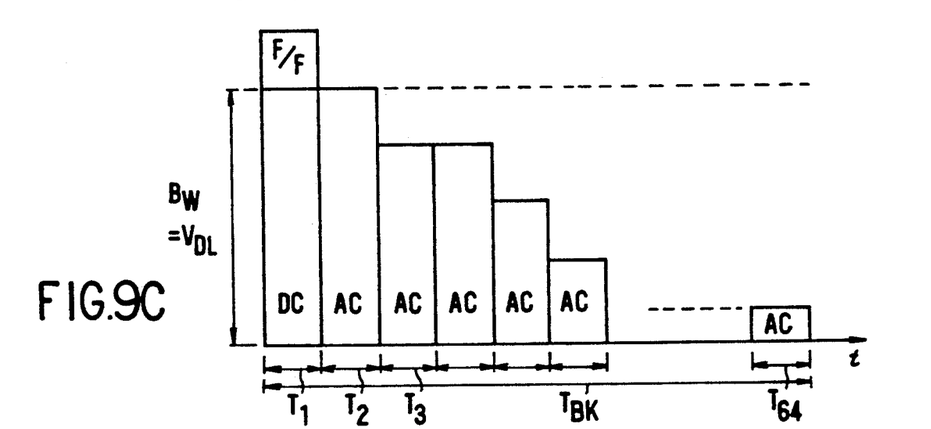

Another problem arises as shown in FIG. 9C in that, in a case where the VLC maximum word length $V_{DL}$ allowed for the DC transformation coefficient data $C_{oeff}(1)$ and data bus width $B_W$ hold the relationship $V_{DL}=B_W$, or in a case where the sum of the VLC maximum word length $V_{DL}$ and the number of bits of the additional data is larger than the data bus width $B_W$, that is, in a case where a selection of ($V_{DL}$+the number of bits of the additional data)$>B_W$ is made, another circuit must be added to the structure in order to process the data of the bits exceeding the data bus width $B_W$. Consequently, a problem arises in that the size of the ensuing circuit including the variable length encoding circuit 16 must be enlarged.

However, according to the above-described embodiment, the additional data time slot $T_0$ is placed in front of the time slots $T_1$ to $T_{64}$ of the transformation coefficient data $C_{oeff}(i)(i=1$ to 64$)$. Therefore, image data which requires, as shown in FIG. 9B, the maximum data bus width $B_W$ as the DC transformation data can be transmitted. As a result, a problem arisen in that the word length of the transformation coefficient data, which constitutes the image data, must be limited can be overcome.

Figure 10A:
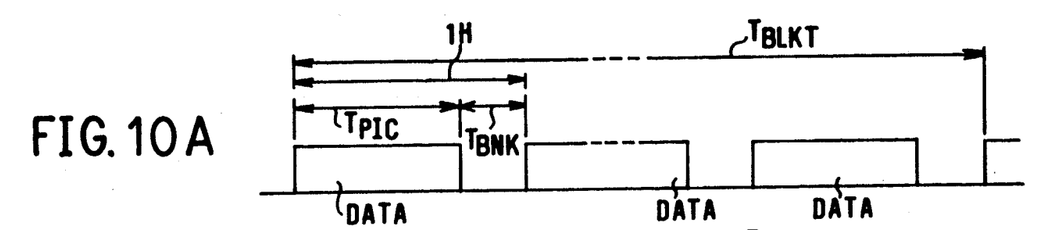
FIGS. 10A to 10C are time charts which illustrate the relationship between the additional data time slot and a blanking period.

When transmission data S17 is formed in accordance with the transformation encoding data S14 to which the additional data time slot $T_0$ is added, the period of the inserted additional data time slot $T_0$ can be included in a blanking period contained in the input video signal $VD_{IN}$. As a result, the number of the transmission fields of the transmission data S17 per unit time can be made to be the same as that of the input video signal $VD_{IN}$.

That is, the input video signal $VD_{IN}$ is, as shown in FIG. 10A, arranged in such a manner that effective pixel data DATA reaches in effective pixel period $T_{PIC}$ in a period of 1H, and effective pixel DATA for the next period of 1H reaches via blanking period $T_{BNK}$.

Figures 10B, 10C:
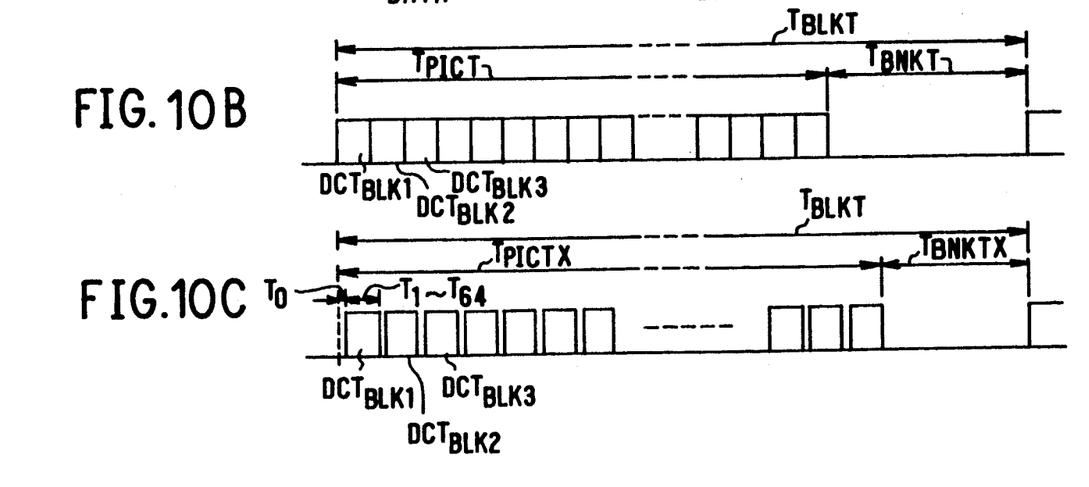

The thus arranged input video signal $VD_{IN}$ is divided into the transmission unit block data S11 in the analog/digital conversion processing portion 11. Then, an assumption is made, as described above with reference to FIG. 4, that the large blocks $H_{BLKh}$ (h=1, 2, ...,) for 8 lines are respectively divided into the DCT blocks $DCT_{BLKj}$ (j=1, 2, ...,) by the discreet cosine transformation circuit 14. The total effective pixel period $T_{PICT}$ of the DCT blocks $DCT_{BLKj}$ (j=1, 2, ...,) which constitute the large blocks $H_{BLKh}$ (h=1, 2, ...,) becomes, as shown in FIG. 10B, the same as the sum of the effective pixel periods $T_{PIC}$ for each period 1H of the input video signal $VD_{IN}$.

On the other hand, total blanking period $T_{BNKT}$ is left in each of the periods other than the total effective pixel period $T_{PICT}$ of the total blanking period $T_{BLKT}$ of the large blocks $H_{BLKh}$ (h=1, 2, ...,), the total blanking period $T_{BNKT}$ being the same as the sum of the blanking periods $T_{BNK}$ included in each 1H of the input video signal $VD_{IN}$.

As described above, the total blanking period $T_{BNKT}$, which is the same as the sum of the blanking periods $T_{BNK}$ of the input video signal $VD_{IN}$, is expected to be generated in a case where the additional data time slot $T_0$ is not added. However, in actual fact, the discrete cosine transformation circuit 14 adds the additional data time slot $T_0$ to each of the DCT blocks $DCT_{BLK1}$, $DCT_{BLK2}$, ..., as shown in FIG. 10C. Therefore, the transformation coefficient output data S27, that is, the transformation encoding data S14 is lengthened by a degree which corresponds to the inserted additional data time slot $T_0$ in comparison to the total effective pixel period $T_{PICTX}$.

However, the period lengthened due to the insertion of the additional data time slot $T_0$ is allowable while preventing a problem in the signal processing operation if the total blanking period $T_{BNKTX}$ is present. Therefore, the transmission data S17 can be transmitted from the video signal encoding apparatus 2 to the video signal decoding device 4 at a transmitting speed which is the same as the number of the fields of the input video signal $VD_{IN}$ per unit time. Furthermore, output video signal $VD_{OUT}$ can be decoded at the same transmitting speed.

(3) Time slot deletion circuit 25A

Figure 11:
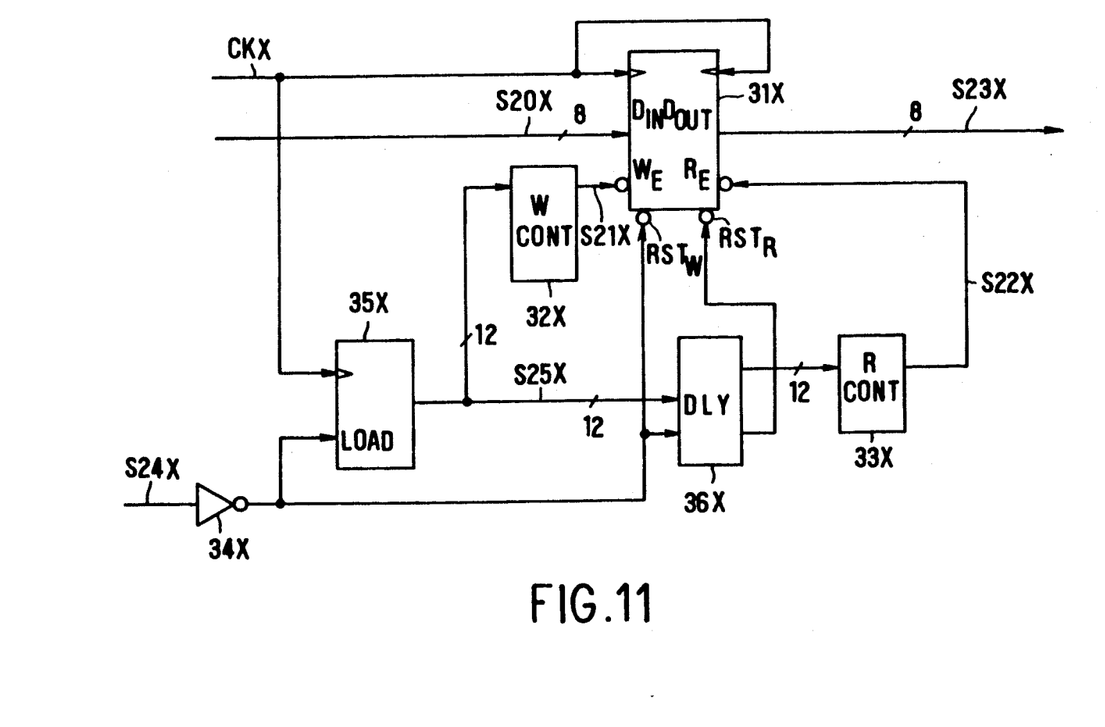
FIG. 11 illustrates the additional data slot deletion circuit 25A shown in FIG. 3 in a further detailed manner.

As shown in FIG. 11, where the elements corresponding to those shown in FIG. 7 are shown with subscript X, the time slot deletion circuit 25A of the discrete cosine inverse transformation circuit 25 is structured in such a manner that the additional data insertion circuit portion constituted by the selection circuit 37 is omitted from the time slot insertion circuit 14A (see FIG. 7).

As described with reference to FIG. 6B, when the transmission data S17 is transmitted to the above-described time slot deletion circuit 25A in accordance with the transformation encoding data S14 into which the additional data time slot $T_0$ is inserted, it writes the transmission data S17 as transformation coefficient input data S20X to a data memory 31X.

However, a writing control circuit 32X performs its control operation in such a manner that it lowers, in the writing mode, the level of a write enable signal S21X for the data memory 31X to a disable signal level during a period in which the additional data time slot $T_0$ reaches. As a result, the additional data which reaches in the additional data time slot $T_0$, that is, the encoding method identification flag data F/F, is prohibited to be written to the data memory 31X.

As a result, conversion coefficient output data S23X, which has been read from the data memory 31X, is returned to a signal from which data of the additional data time slot $T_0$ is eliminated and which contains only the DC transformation coefficient data and the AC transformation coefficient data as the transformation coefficient input data S20 described with reference to FIG. 6A.

(4) Effect of the embodiment

According to the structure shown in FIG. 11, when the encoding method identification flag data F/F denoting the encoding method which was used when the difference data S13 is formed for each of the DCT blocks $DCT_{BLKj}$ (j=1, 2, ...,), the additional data time slot $T_0$ being provided independently from the time slots $T_1$ to $T_{64}$ to be allocated to the discrete cosine transformation coefficient data $C_{oeff}(i)(i=1$ to 64). Consequently, a video signal encoding apparatus can be provided which is capable of overcoming a problem of the presence of a limitation in the length of the variable length encoding word of the discrete cosine transformation coefficient data and another problem in terms of the necessity of enlarging the size of the signal processing circuits for transmitting the discrete cosine transformation coefficient data.

(5) Another embodiments (5-1) The above-described embodiment is arranged in such a manner that the encoding method identification flag data F/F is allocated as the additional data to be allocated to the inserted additional data time slot $T_0$. However, another structure, from which a similar effect to that obtainable from the above-described embodiment can be obtained, may be employed which is arranged in such a manner that control data such as motion vector data is allocated.

Figure 12A:
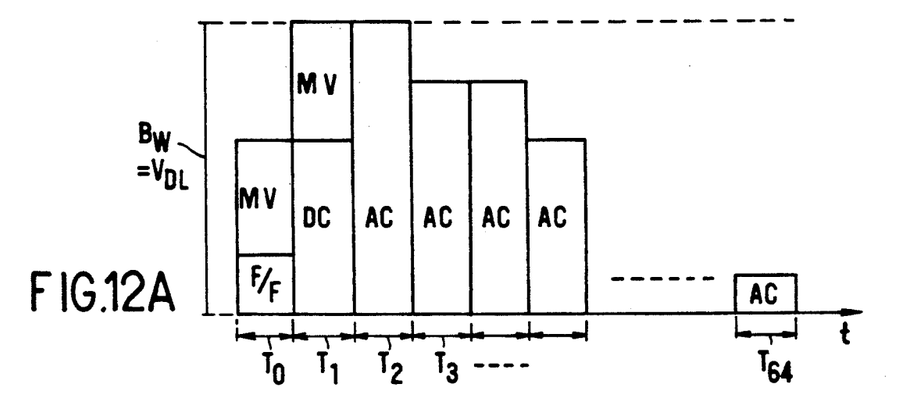
FIGS. 12A and 12B are time charts which illustrate another embodiment of the present invention.
Figure 12B:
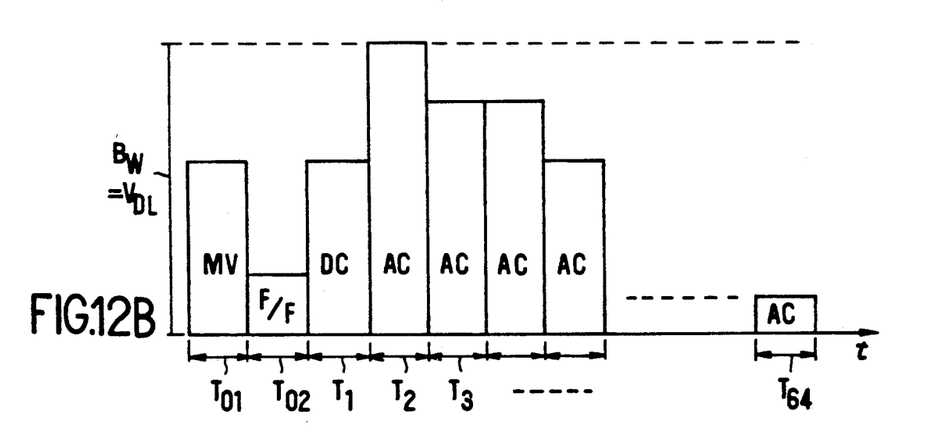

When, for example, the encoding method identification flag data F/F and motion vector MV are inserted in the above-described case, two additional data items, that is, the encoding method identification flag data F/F and the motion vector data MV may, as shown in FIG. 12A, be respectively allocated to the lower bit and the upper bit of one additional data time slot $T_0$. According to circumstances, another structure, as shown in FIG. 12B, may be employed which is arranged in such a manner that a plurality of, for example, two additional data time slots $T_{01}$ and $T_{02}$ are inserted and the motion vector data MV and the encoding method identification flag data F/F are respectively allocated to the individual additional data time slots $T_{01}$ and $T_{02}$.

As a result, if the word length of the additional data exceeds the data bus width $B_W$, it can be dispersively allocated to the plurality of the additional data time slots. As a result, required control data can be transmitted in a predetermined limitation range of the data bus width.

(5-2) According to the above-described embodiment, the present invention is applied to a structure for transmitting a video signal of the HDTV system. The present invention is not limited to the above-described TV system. For example, the present invention can be applied to various systems such as the NTSC system, the PAL system and the SECAM system in each of which a TV signal is transmitted after it has been encoded in a high efficiency manner.

(5-3) According to the above-described embodiment, the structure is arranged in such a manner that the process of encoding between frames and the intrafield encoding process are adaptively performed as the high efficiency encoding process to be performed by the video data encoding circuit 12. The present invention is not limited to the above-described encoding method. The present invention may be applied to a variety of structures in which the difference data S13 is formed in accordance with the interframe encoding process or the intrafield encoding process.

As described above, according to the present invention, when a video signal is encoded in a high efficiency manner for each of the discreet cosine transformation blocks, control information, which is generated when the above-described high efficient encoding process is performed, is allocated to the time slot inserted additionally to the time slots allocated to the discreet cosine transformation coefficient data. Consequently, a video signal encoding apparatus can easily be provided which is carable of overcoming a problem of the presence of a limitation in the length of the word of the coefficient data and another problem in terms of the necessity of enlarging the size of circuits for processing the transformation coefficient data.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. Apparatus for encoding a plurality of fields and frames of video data which represent a plurality of video images, said apparatus comprising:

converting means for converting said video data into a plurality of blocks each having a plurality of video data elements;

predicting means for generating blocks of predicted video data elements from previous blocks of said video data elements;

means for detecting motion between video images respectively represented by a current block of said video data elements and a corresponding block of said predicted video data elements;

encoding means for encoding said blocks of video data elements in accordance with an interframe encoding technique when the detected motion is less than a predetermined value and in accordance with one of an intrafield and intraframe encoding technique when the detected motion is at least equal to said predetermined value so as to form blocks of encoded video data elements;

discrete cosine transformation means for generating a plurality of transformation coefficient data from said blocks of said encoded video data elements and for supplying therefrom a transformation encoded signal having a plurality of time slots for each portion of said transformation encoded signal, in which each said portion corresponds to one of said blocks of said encoded video data elements and in which each said transformation coefficient data is supplied in a respective one of said time slots; and means for adding at least one additional time slot in each said portion of said transformation encoded signal and for inserting therein respective identification flag data indicating the encoding technique utilized by said encoding means for the respective block of said video data elements.

2. The apparatus according to claim 1, wherein said means for inserting further inserts motion vector data into said at least one additional time slot.

* * * * *